United States Patent
Vogety et al.

(10) Patent No.: US 8,204,009 B2
(45) Date of Patent: Jun. 19, 2012

(54) PROVIDING CONNECTIVITY BETWEEN SUBNETS OF A WIRELESS NETWORK

(75) Inventors: Ramanagopal Vogety, Milpitas, CA (US); Mukesh Gupta, Milpitas, CA (US)

(73) Assignee: Tropos Networks, Inc., Sunnyvale, CA (US)

(*) Notice: Subject to any disclaimer, the term of this patent is extended or adjusted under 35 U.S.C. 154(b) by 876 days.

(21) Appl. No.: 11/805,998

(22) Filed: May 25, 2007

(65) Prior Publication Data

US 2008/0291929 A1 Nov. 27, 2008

(51) Int. Cl.
*H04W 4/00* (2009.01)
(52) U.S. Cl. ........ 370/329; 370/357; 370/401; 370/351; 370/402
(58) Field of Classification Search ................ 455/432.1, 455/522; 370/338, 389, 400, 331, 395.54, 370/357, 401, 351, 329, 402
See application file for complete search history.

(56) References Cited

U.S. PATENT DOCUMENTS

| | | | |
|---|---|---|---|
| 6,873,616 B1* | 3/2005 | Fedyk et al. | 370/357 |
| 7,177,295 B1* | 2/2007 | Sholander et al. | 370/338 |
| 2005/0074015 A1* | 4/2005 | Chari et al. | 370/400 |
| 2005/0164729 A1 | 7/2005 | Narayanan et al. | |
| 2005/0188098 A1* | 8/2005 | Dunk | 709/232 |
| 2006/0133341 A1 | 6/2006 | Chari et al. | |
| 2006/0234701 A1 | 10/2006 | Wang et al. | |

* cited by examiner

*Primary Examiner* — Kamran Afshar
*Assistant Examiner* — Manpreet Matharu
(74) *Attorney, Agent, or Firm* — Brian R. Short (57) ABSTRACT

A method of providing connectivity between subnets of a wireless network is disclosed. The method includes each gateway of each subnet selecting less than all gateways of each other subnet of the wireless network. An adjacency is formed between each gateway and each of the less than all selected gateways of each other subnet.

23 Claims, 5 Drawing Sheets

PROVIDING CONNECTIVITY BETWEEN SUBNETS OF A WIRELESS NETWORK

FIELD OF THE DESCRIBED EMBODIMENTS

The described embodiments relate generally to wireless communications. More particularly, the described embodiments relate to a method and apparatus for providing connectivity between subnets of a wireless network.

BACKGROUND

Wireless networks typically allow a wireless device to connect to the wireless networks through a base station or access point that is wired to the network. The wireless device can transmit data packets that are received by the base station or access point and then routed through the network. The wireless network can include many base stations or access points that are each wired to the network.

The wireless devices are typically mobile, and therefore, require access to more than one base station. When a wireless device travels from an access range of a first base station to an access range of a second base station, a handoff must occur as the connection between the wireless device and the first base station stops, and a new connection between the wireless device and the second base station begins.

An advanced mobile phone system (AMPS) employs a centrally coordinated approach to accomplish handoffs as a mobile phone roams from on cell (defined by a base station) to another cell. When a connection to a mobile phone is to be made, a mobile telephone switching office (MTSO) attempts to locate the mobile phone by instructing all cell sites to page the mobile phone. If the MTSO is connected to a large number of cell sites, and there are a large number of mobile phones, the number of pages is substantial. Handoffs are requested by the mobile device (phone). This approach requires a centralized control which makes it non-scalable. Additionally, this approach requires intelligence within the mobile device so that the device can signal the MTSO when a handoff is necessary. Additionally, routing can be inefficient.

A wireless mesh network includes wireless access nodes interconnected by a mesh of wireless links. Generally, mesh networks suffer from the same handoffs limitations as the mobile phone system. More specifically, handoffs require specific hardware and software within the mobile device to support handoffs within the wireless network.

It is desirable to have a wireless mesh network that allows wireless handoffs of a client between access nodes of different subnets of the mesh network, and does not require the client to include special hardware or software. It is additionally desirable that that the wireless mesh networks be scalable.

SUMMARY

An embodiment includes a method of providing connectivity between subnets of a wireless network. The method includes each gateway of each subnet selecting less than all gateways of each other subnet of the wireless network. Adjacencies are formed between each gateway and each of the less than all selected gateways of each other subnet.

Another embodiment includes a method of supporting client roaming between subnets of a wireless network. The method includes each gateway of each subnet selecting less than all gateways of each other subnet of the wireless network, and forming an adjacency between each gateway and each of the less than all selected gateways of each other subnet.

Another embodiment includes a method of selecting adjacencies between gateways of different subnets of a wireless network. The method includes creating an ordered list of all the subnets of the wireless network and creating an ordered list of all gateways within each subnet. An originator subnet from the ordered list of subnets is selected. A destination subnet from the ordered list of subnets is selected. Each gateway of the originator subnet selects one or more gateways from the ordered list of gateways of the destination subnet. Adjacencies are formed between each of the gateways of the originator subnet and the selected one or more consecutively ordered gateways of the destination subnet.

Other aspects and advantages of the described embodiments will become apparent from the following detailed description, taken in conjunction with the accompanying drawings, illustrating by way of example the principles of the described embodiments.

DETAILED DESCRIPTION

The embodiments described provide adjacencies between gateways of different subnets of a wireless mesh network. The adjacencies provide communication between the gateways of the different subnets, and support client device roaming between different subnets of the wireless mesh network.

Figure 1:
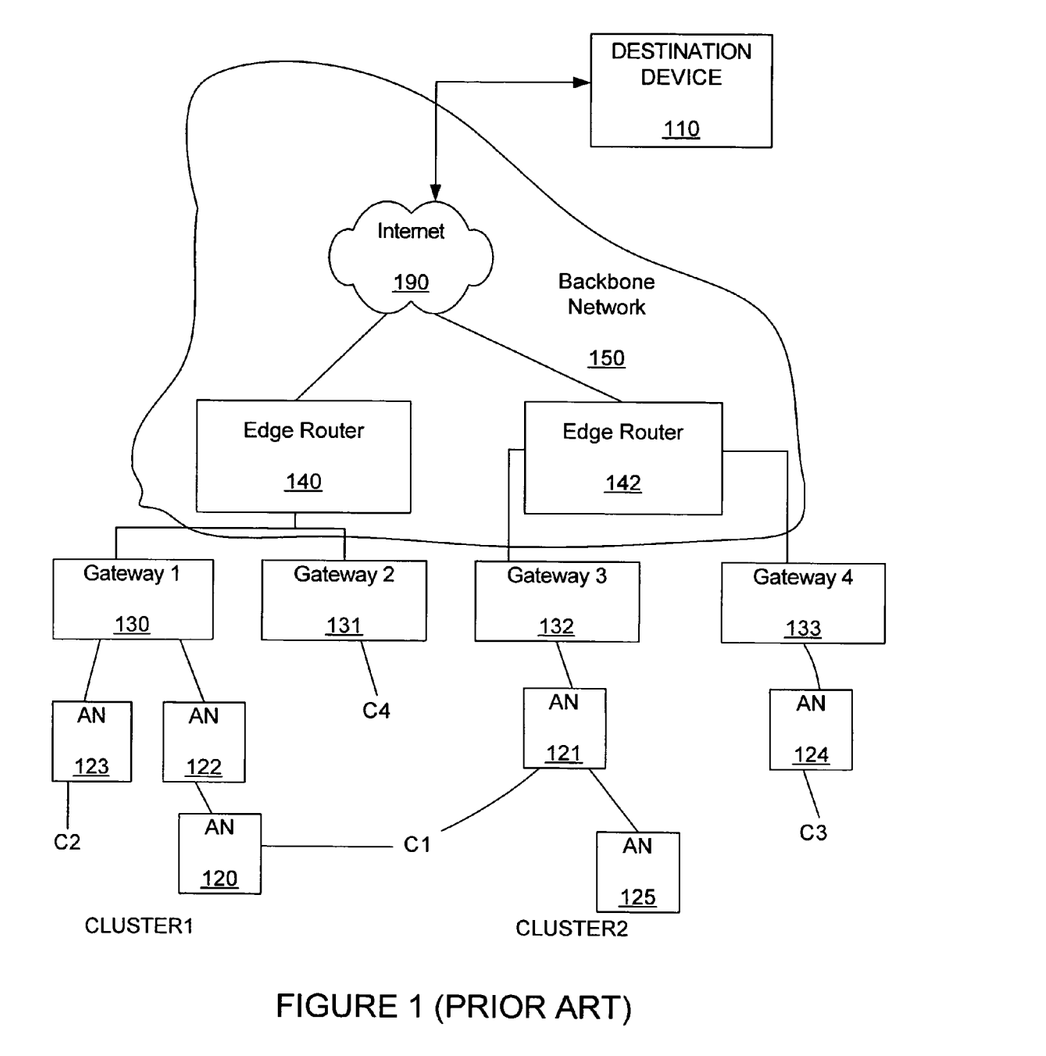
FIG. 1 shows an example of a wireless network that includes gateways of different subnets.

FIG. 1 shows an example of a wireless mesh network. Generally, the wireless network allows a client C1 to communicate with a destination device 110, as the client C1 roams from wireless access with a first access node 120 to wireless access with a second access node 121. The wireless access nodes 120, 121 generally belong to a wireless mesh network, but can belong to different subnets of the wireless network.

The wireless mesh network as shown in FIG. 1 includes a first gateway 130, a second gateway 131, a third gateway 132 and a fourth gateway 133. Generally, the gateways 130, 131, 132, 133 are wire or wirelessly connected a first edge router 140 and a second edge router 142 of a backbone network 150. The edge routers 140, 141 provide wired connections to an internet network 190. The destination device 110 is connected to the internet 190, thereby providing a communications path between the gateways 130, 131, 132, 133 and the destination device 110. Generally, the edge routers define separate subnets. That is, the first edge router 140 generally defines a first subnet, and the second edge router 142 defines a second subnet.

As described, subnets are generally defined by edge routers. Subnets can be categorized into home and foreign subnets. A home gateway is a gateway that is connected to an edge router that has a direct subnet route to the subnet to which the client device's IP address belongs. A foreign gateway is a gateway that is connected to an edge router that does not have a direct subnet route to the subnet to which the client device's IP address belongs. Foreign subnets include foreign clusters that include foreign gateways. Foreign gateways are associated with subnets other than the home subnet, but can connect a client to the network. As shown in FIG. 1, clusters (such as CLUSTER1 associated with the gateway 130 and connected to the edge router 140), are associated with a first subnet, and clusters (such as CLUSTER2) associated with the gateways 132, 133, and connected to edge router 142 are associated with a different subnet.

As previously described, the gateways 130, 131, 132, 133 belong to a wireless mesh network. The wireless mesh network can additionally include many wireless access nodes, including the previously mentioned first and second access nodes 120, 121. The wireless mesh network can additionally include a third access node 122, a fourth access node 123, a fifth access node 124, and a sixth access node 125.

As shown in FIG. 1, the third and fourth access nodes 122, 123 are wirelessly connected to the first gateway 130. The single wireless link between the first gateway 130 and the third and fourth access nodes 122, 123 can be designated as a single hop. The first access node 120 is wirelessly connected to the third access node 122. The double wireless link between the first gateway 130 and the first access node 120 can be designated as a double hop.

The access nodes and devices of a gateway can define a cluster. For example, a first cluster (CLUSTER1) of FIG. 1 includes first gateway 130, the first, third and fourth access nodes 120, 122, 123 and the hub 160. A second cluster (CLUSTER2) can include the third gateway 132, the second access node 121, and the second hub 162. A third cluster can include the second gateway 131 that is wirelessly connected to a fourth client C4. A fourth cluster can include the fourth gateway 133 that is wirelessly connected to a fifth access node 124. The fifth access node 124 can be wirelessly connected to a third client C3.

A client generally can include a laptop computer, a personal digital assistant (PDA), a cell-phone, or any other device that includes an interface card adaptable for use with the mesh network of the invention. The client can access the network though wired or wireless connections. Wireless clients can access the network through a MAC (media access control), PHY (physical layer) protocol such as IEEE 802.11. The 802.11 protocol includes authentication and association protocols between client devices and the network. The client device can include a NIC (network interface card). The wireless clients can include a wireless to wired CPE (consumer premises equipment) bridge designed to accept a wireless backhaul connection while providing wire Ethernet connectivity inside a home. The wireless to wired CPE can connect one or more Ethernet-equipped client device (such as laptops or personal computers) to the wireless access network. Such a configuration can be referred to as "clients behind a CPE". The client device can be directly connected (for example, by Ethernet) to an Ethernet port on a wireless mesh access node. For example, the client device could be an IP video camera attached to an Ethernet port of street-light mounted mesh access node. This type of client device can be referred to as a "wired client".

An access node generally includes any point of attachment of a client with the mesh network. The access node can be a wireless access point, a wired access point, a router, a hub, a gateway, or any other networking device capable of attachment to a client.

A gateway is a network entity that maintains an address mapping table for each client. As will be described, the address mapping table generally includes a MAC-IP address mapping for the client devices. A single gateway corresponds with each access node. However, each gateway can service several access nodes. A gateway may also serve as an access node, providing a point of attachment to client devices.

A cluster is defined as a set of access nodes that are serviced by a single gateway.

A gateway can be an access node. In this case, the gateway generally includes one or more downlink interfaces. An embodiment includes the gateway being an edge router between wired and wireless networks. This embodiment generally includes the gateway being at a cluster boundary. Here, the cluster is defined as the maximal set of access nodes and client devices serviced by the gateway.

A backbone network is generally defined as all network elements that are not a part of the access network.

An edge router is generally a network element that is directly connected to a gateway through a wired or wireless connection. The edge router is not a member of a cluster. The edge router implements routing logic to aid in the forwarding and routing of packets. Generally, the edge routers define separate subnets of the network.

A subnet is a portion of a network that shares a common address component. On TCP/IP networks, subnets are defined as all devices whose IP addresses have the same prefix. For example, all devices with IP addresses that start with 100.100.100 are part of the subnet 100.100.100.0 with subnet mask 255.255.255.0. Dividing a network into subnets is useful for both security and performance reasons.

The internet is a global network connecting millions of computers, in which control of the network is decentralized. Generally, each internet computer is independent, and referred to as a host.

An exemplary embodiment of the gateways includes the gateways 130-133 broadcasting routing packets (beacons), which can be used to determine routing between access nodes 120-124 and gateways 130-133 of the network. The beacons are received by all first-level access nodes (for example, access nodes 121-124), which are access nodes that are able to receive gateway transmitted beacons, and directly route data through to a gateway.

The beacons are used to establish a route from each access node to a gateway. The first level access nodes re-broadcast the beacon data, attaching their own information to the beacon. The information indicates to the second level access nodes that the path to the gateway includes the first level access node.

For one embodiment, the link quality of the beacon received determines whether that beacon is rebroadcast by the system. If the quality of the beacon is above a determined threshold, it is rebroadcast. The beacons can be used to determine the quality of the link in both an upstream (towards a gateway) direction, and in a downstream (away from a gateway) direction. The upstream and the downstream link qualities can be used by each access node to select the best data routing path to a gateway.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway.

Downstream nodes are nodes that receive the beacon from a particular access node, and define their path to the gateway through that access node. FIG. 1 also includes a second level access node 120.

Figure 2:
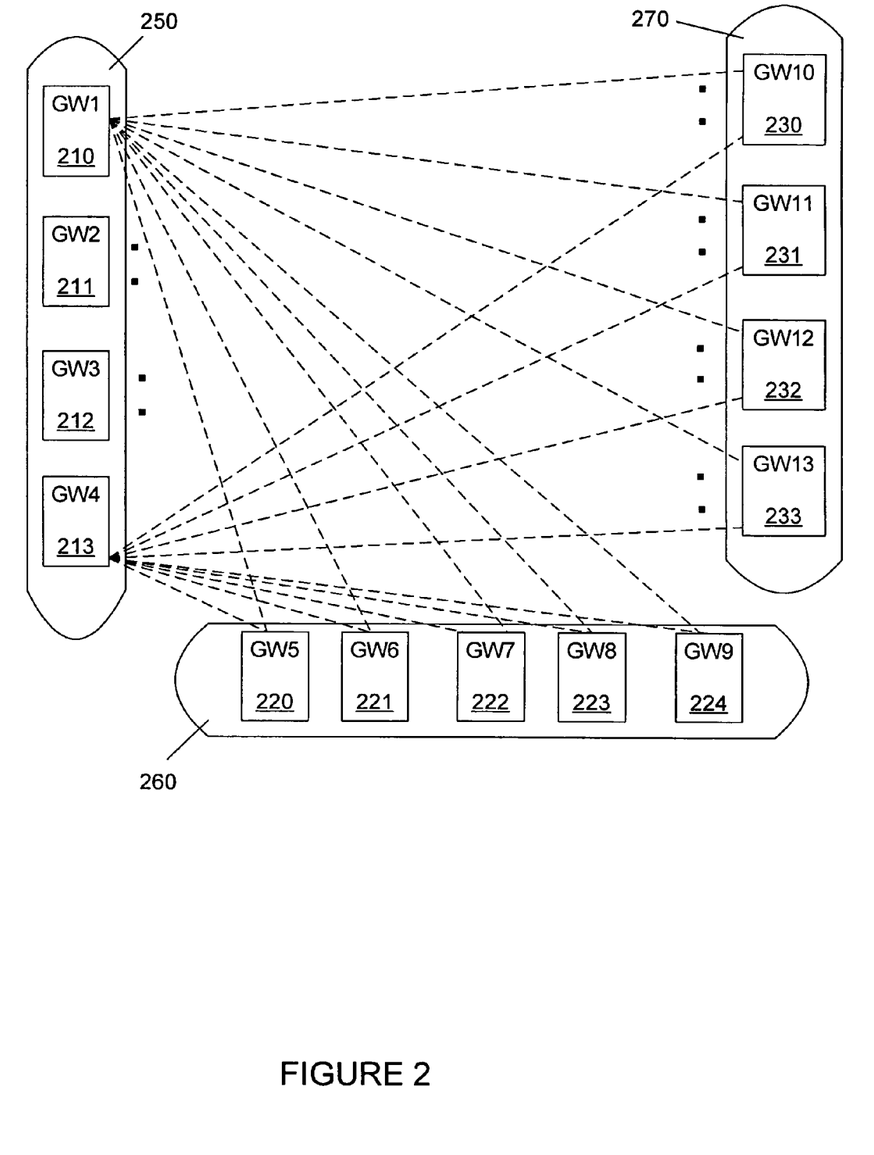
FIG. 2 shows an example of gateways of different subnets having adjacencies formed between all of the gateways to support client roaming between gateways of different subnets.

FIG. 2 shows an example of gateways of different subnets having adjacencies formed between all of the gateways to support client roaming between gateways of different subnets. As shown, every gateway of each of the subnets is connected to every other gateway of all other subnets. The adjacencies are formed to support communication between subnets, which allows for client device mobility between subnets.

That is, as shown, gateway 1 (GW1) of a first subnet 250 has adjacencies formed to every other gateway 220-224 of a second subnet 260, and every gateway 230-233 of a third subnet 270. Also as shown, gateway 4 (GW4) of the first subnet 250 has adjacencies formed to every other gateway 220-224 of a second subnet 260, and every gateway 230-233 of a third subnet 270. Each of the other gateways 211, 212 also have adjacencies formed (not shown) to every other gateway of every other subnet 260, 270. Each of the gateways 220-224 of the second subnet 260 have adjacencies formed with every gateway 210-213 of the first subnet 250. Also, as not shown, each of the gateways 220-224 of the second subnet 260 have adjacencies formed with every gateway 230-233 of the third subnet 270. Each of the gateways 230-233 of the third subnet 270 have adjacencies formed with every gateway 210-213 of the first subnet 250 and with every gateway 220-224 of the second subnet 260.

The formation of adjacencies between every gateway of every subnet to every other gateway of every other subnet requires a large amount of resources to support all of the adjacencies. Additionally, the formation of so many adjacencies is not consistent with wireless mesh network scalability. That is, increasing the size of the wireless network become onerous due to the support required to form and maintain adjacencies between every gateway of every subnet of the wireless network.

Figure 3:
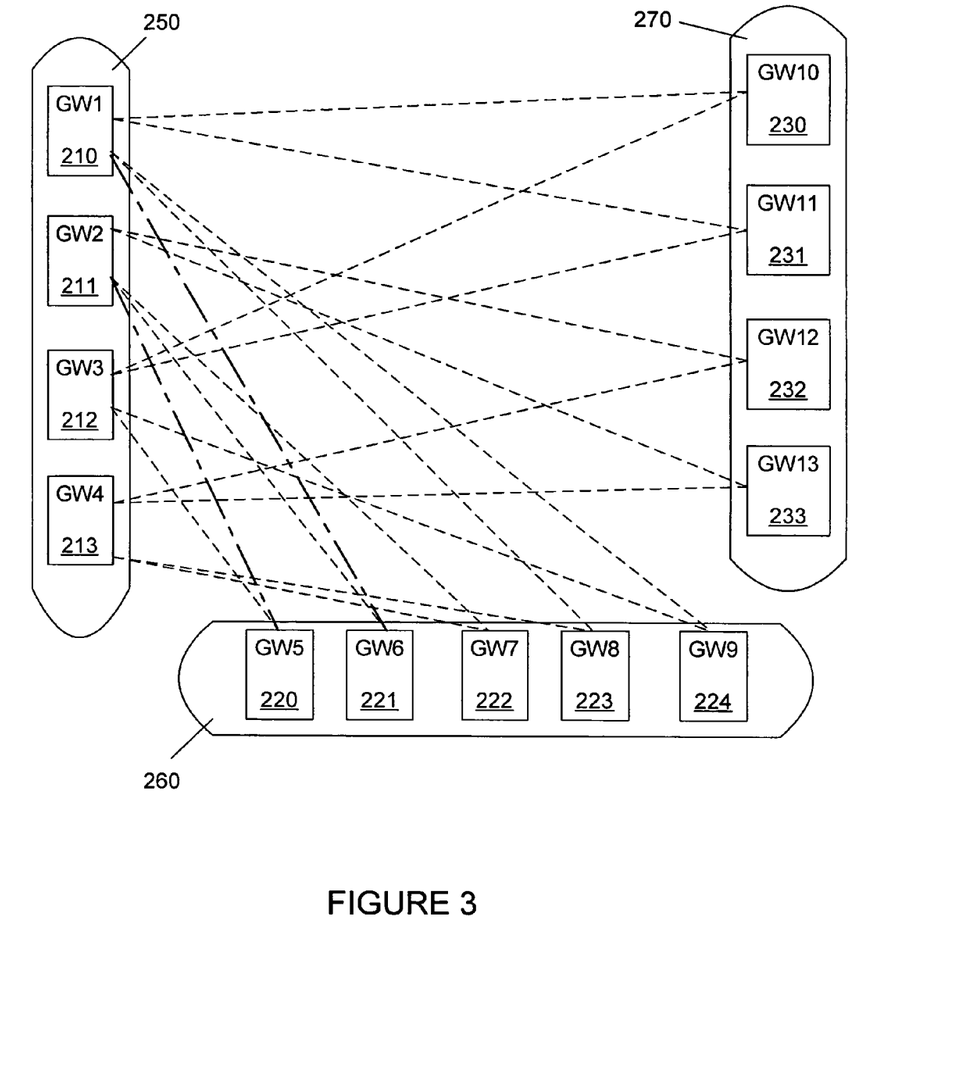
FIG. 3 shows an example of gateways of different subnets having adjacencies formed between a subset of the gateways to support client roaming between gateways of different subnets.

FIG. 3 shows an example of gateways of different subnets having adjacencies formed between a subset of the gateways to support client roaming between gateways of different subnets. As shown, each gateway of each subnet has an adjacency formed with only two (a subset of the total number of gateways) gateways of each of the other subnets. For clarity in depiction, only the adjacencies formed between the first subnet 250 and the second and third subnets 260, 270 are shown. That is, the adjacencies formed between the second and third subnets 260, 270 are not shown. However, it is to be understood that a similar selection process can be made between the second and third subnets 260, 270.

Generally, the selection process includes determining how many adjacencies should be formed (will be described), and a level of redundancy is selected. Each gateway of each subnet selects gateways of the other subnets in which adjacencies are to be formed.

By forming adjacencies between a subset of the gateways rather than all of the gateways of each other subnet, reductions in over-head are realized. Additionally, the network architecture is more scaleable.

The selection of which gateway are to have adjacencies between them can be made at a centralized server. Alternatively, the selection process can be made at each gateway, and therefore, be decentralized.

Figure 4:
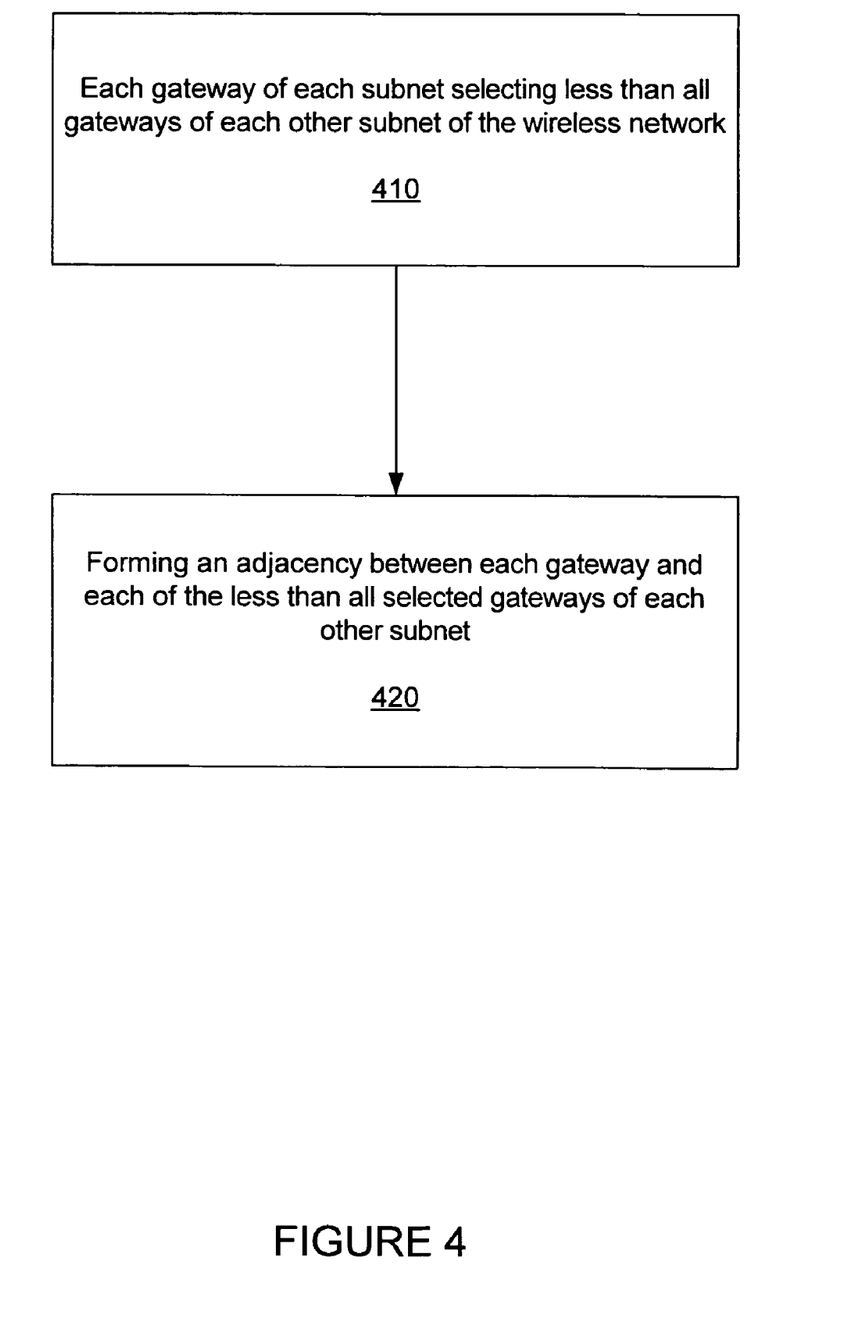
FIG. 4 is a flow chart that shows one example of steps of a method for providing connectivity between subnets of a wireless network.

FIG. 4 is a flow chart that shows one example of steps of a method for providing connectivity between subnets of a wireless network. A first step 410 includes each gateway of each subnet selecting less than all gateways of each other subnet of the wireless network. A second step 420 includes forming an adjacency between each gateway and each of the less than all selected gateways of each other subnet.

Selecting Gateways of Other Subnets

As previously stated, each gateway of each subnet selects less than all gateways of each other subnet for the formation of gateways. The following description assumes that at least two adjacencies are to be formed between each gateway and gateways of other subnets. However, it is to be understood that this is one embodiment, and other embodiments include more than at least two adjacencies being formed between each gateway and the gateways of other subnets.

The selection process of one embodiment includes initially creating an ordered list of all of the subnets of the wireless network. For each subnet, an ordered list of all of the gateways within the subnet is created.

The selection process then includes designating one of the ordered list of subnets, as an originator subnet. For an embodiment, the subnet initially designated as the originator is the first subnet of the ordered subnet list. For the designated originator subnet, typically the first gateway of the ordered list of gateways of the originator subnet is chosen to select gateways of a destination subnet. For an embodiment, the destination subnet is a subnet that occurs in the list of subnet after the originator subnet.

For an embodiment, the originator subnet selects one or more (as previously described, this can be more than two to provide redundancy) gateways of the destination subnet for the first gateway of the originator subnet. The two selected gateways of the destination subnet can be the two gateways that occur first on the list of gateways of the destination subnet. The originator subnet then selects the next two gateways of the destination subnet for the second gateway of the list of gateways of the originator subnet. The selection process continues until each of the gateways of the originator subnet and the destination subnet have at least two gateways in which adjacencies are to be formed. If the originator subnet includes more gateways than the destination subnet, then one or more of the gateways of the destination subnet will have more than two selected adjacencies. If the originator subnet has fewer gateways than the destination subnet, then one or more of the gateways of the originator subnet will have more than two selected adjacencies.

The selection process of the originator subnet continues through until gateways in which adjacencies are to be formed are selected for the remainder of the destination subnets. That is, each of the remaining subnets that occur on the ordered list of subnets are each designated as destination subnets, and the selection of gateways of each destination subnet in which adjacencies are to be formed with the gateways of the originator subnet are made.

For an embodiment, the next subnet of the ordered list is designated as the originator subnet, and each of the subnets that occur on the ordered list after the originator subnet are designated as destination subnets. The selection process is repeated for each gateway of the originator subnet. The selection process is continued until at least two gateway selections have been made for each gateway of each subnet of the wireless network.

Forming Adjacencies

Generally, forming an adjacency includes each gateway notifying the selected gateways of the selection. The formation is completed when each selected gateway responds with a confirmation of the selection. Once the adjacencies have been formed, gateways that have adjacencies formed between them can exchange subnet properties. Examples of subnet properties that are typically exchanged include WiFi properties, data and voice plans, broadband services, reachability information, and/or client information.

The formed adjacencies are useful for exchanging client information between gateways. For example, when a client roams from a home subnet to a foreign subnet, the gateway of the new (foreign) subnet needs access to client information to support the roam. The new gateway can get the client information by querying the old (home) subnet for the client information. Once the client information has been obtained, a data path can be provided by the adjacency to support an existing client connection.

Gateways of different subnets can proactively exchange client information. That is, each gateway can proactively update one or more gateways that the gateway has formed adjacencies with. The proactive updates can more specifically be with relevant gateways. Gateways can be determined to be relevant by the physical proximity of the gateways, and/or by service agreements.

When a client device roams from a gateway of a first subnet to a gateway of a second subnet, data needs to flow between the subnets in order to support roaming of the client device between the subnets. That is, a data path must be established between the subnet. The data path can be established by the formation of adjacencies between gateways of the different subnets.

After the adjacencies have been formed, an embodiment includes maintaining the adjacencies. One method of maintaining the adjacencies includes periodically sending keep alive packets between gateways that have adjacencies formed between them, and eliminating an adjacency if a reasonable response to the keep alive packets it not received.

When an adjacency has failed, backup or replacement adjacencies are formed. That is, backup adjacencies are adaptively formed when at least one of the adjacencies has failed. More specifically, forming the backup adjacencies includes the gateway of the failed adjacency reselecting a gateway of the other subnet.

Figure 5:
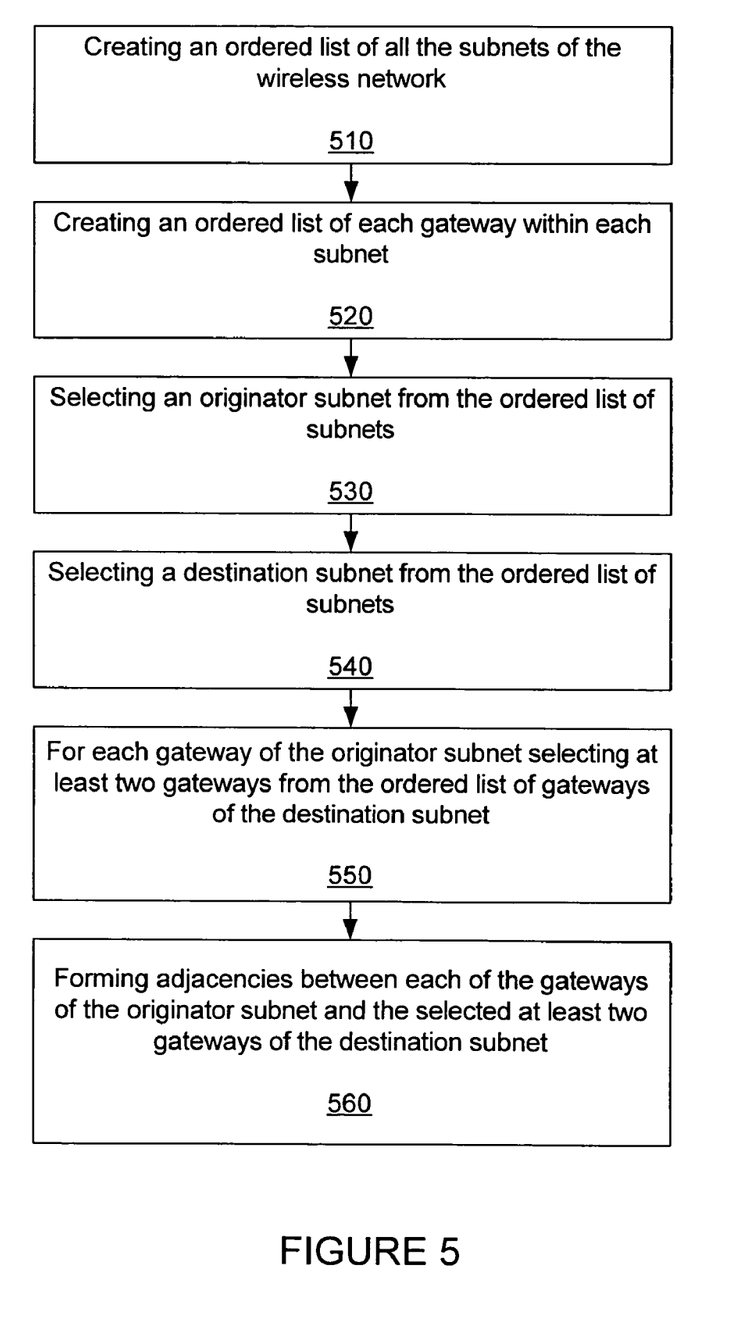
FIG. 5 is a flow chart that shows one example of steps of a method for selecting gateways for forming adjacencies between subnets.

FIG. 5 is a flow chart that shows one example of steps of a method for selecting gateways for forming adjacencies between subnets. A first step 510 includes creating an ordered list of all the subnets of the wireless network. A second step 520 includes creating an ordered list of all gateways within each subnet. A third step 530 includes selecting an originator subnet from the ordered list of subnets. A fourth step 540 includes selecting a destination subnet from the ordered list of subnets. A fifth step 550 includes for each gateway of the originator subnet selecting at least two gateways from the ordered list of gateways of the destination subnet. A sixth step 560 includes forming adjacencies between each of the gateways of the originator subnet and the selected at least two consecutively ordered gateways of the destination subnet.

As previously described, the selection process of one embodiment includes initially creating an ordered list of all of the subnets of the wireless network. For each subnet, an ordered list of all of the gateways within the subnet is created.

The method of determining the order of the ordered lists is less important than ensuring that all of the subnets of the wireless network are on the ordered list of subnets, and ensuring that all of the gateways of each subnet are on the ordered list of gateways of each subnet. However, when the selection process is decentralized, and each gateway individually makes the selections, then the order of the ordered lists must be the same for each of the gateways.

An embodiment includes determining how many adjacencies are to be formed between the originator subnet and the destination subnet by determining which of the originator subnet and the destination subnet has a larger number of gateways, multiplying the number of gateways of the larger subnet by a redundancy number, and dividing the result by a number of gateways within the originator subnet. An embodiment includes the redundancy number being two. However, it is to be understood that the redundancy number can be one or more.

The selection process can include a first ordered gateway of the originator subnet selecting a plurality of first ordered gateways of the destination subnet. The selection is based on the ordered list of gateways of the destination subnet. For an embodiment, each successive gateway of the originator subnet selects a next of plurality of gateways of the destination subnet, until selections have been made to occupy the entire number of adjacencies to be formed between the originator subnet and the destination subnet.

Each of remaining subnets of the ordered list of subnets, designates each of remaining subnets the originator subnet, and repeating the selection of adjacencies with destination subnets. Each remaining subnet is designated as the originator subnet, and for each gateway of the originator subnet, at least two gateways of the destination subnet are selected for the formation of adjacencies. The destination subnet designators are made from the remaining subnets of the ordered list of subnets. The selection of originator and destination subnets is made continuously until each gateway of each subnet has at least two gateways of all other subnets for formation of adjacencies.

The selection process can be performed at a centralized server, or it can be performed by each gateway of the wireless mesh network. If the selection process is made at a centralized server, then the order of the ordered list is not critical. However, and embodiment includes decentralized processing in which each gateway performs the method of selecting adjacencies between gateways, wherein each gateway creates a same ordered list of subnets, and a same list of ordered gateways for each subnet.

Although specific embodiments have been described and illustrated, the embodiments are not to be limited to the specific forms or arrangements of parts so described and illustrated.

What is claimed:

1. A method of providing connectivity between subnets of a wireless network, comprising:
    each gateway of each subnet selecting less than all gateways of each other subnet of the wireless network, wherein the selecting comprises creating an ordered list of gateways of each other subnet, and selecting at least two consecutively ordered gateways;
    forming an adjacency between each gateway and each of the less than all selected gateways of each other subnet; comprising each gateway notifying the selected gateways of the selection, and each selected gateway responding with a confirmation of the selection; wherein gateways that have adjacencies formed between them exchange subnet properties;
    establishing a data path through each formed adjacency, allowing a wireless client device to roam from each gateway to a one of the selected gateways while maintaining communications through the wireless network with a destination device; and
    adaptively forming backup adjacencies when at least one of the adjacencies has failed.

2. The method of claim 1, wherein the exchanged subnet properties comprises at least one of WiFi properties, data and voice plans, broadband services, reachability information, client information.

3. The method of claim 1, further comprising the gateways that have adjacencies formed between them querying client information, and responding with the client information.

4. The method of claim 1, further comprising each gateway proactively updating at least one adjacent relevant gateway with at least a subset of client information.

5. The method of claim 4, wherein adjacent relevant gateways are determined by at least one of gateway proximity and service agreements.

6. The method of claim 3, wherein only one of the gateways in which adjacencies are formed respond.

7. The method of claim 3, wherein all of the gateways in which adjacencies are formed respond.

8. The method of claim 1, wherein the gateways that have adjacencies formed between them provide a data path for end user client roaming between subnets.

9. The method of claim 8, further comprising a client device roaming from a first subnet to a second subnet, and a gateway from the second subnet querying client information from a gateway of the first subnet through a formed adjacency.

10. The method of claim 1, further comprising maintaining the adjacencies between the gateways.

11. The method of claim 10, wherein maintaining adjacencies comprises:
periodically sending keep alive packets between gateways that have adjacencies formed between them;
eliminating an adjacency if a reasonable response to the keep alive packets it not received.

12. The method of claim 1, wherein forming the backup adjacencies comprises the gateway of the failed adjacency reselecting a gateway of the other subnet.

13. The method of claim 1, wherein adjacencies are formed between each gateway and two selected gateways of each other subnet.

14. The method of claim 1, wherein selecting less than all gateways of each other subnet comprises selecting adjacencies between gateways of different subnets of a wireless network, comprises:
creating an ordered list of all the subnets of the wireless network;
creating an ordered list of all gateways within each subnet;
selecting an originator subnet from the ordered list of subnets;
selecting a destination subnet from the ordered list of subnets;
for each gateway of the originator subnet selecting at least two gateways from the ordered list gateways of the destination subnet;
forming adjacencies between each of the gateways of the originator subnet and the selected at least two consecutively ordered gateways of the destination subnet.

15. A wireless network that supports client roaming between subnets of the wireless network, comprising:
a plurality of gateways, each gateway of each subnet selecting less than all gateways of each other subnet of the wireless network, wherein the selecting comprises creating an ordered list of gateways of each other subnet, and selecting at least two consecutively ordered gateways;
the wireless network operative to form an adjacency between each gateway and each of the less than all selected gateways of each other subnet; comprising each gateway notifying the selected gateways of the selection, and each selected gateway responding with a confirmation of the selection; wherein gateways that have adjacencies formed between them exchange subnet properties;

the wireless network operative to establish a data path through each formed adjacency, allowing a wireless client device to roam from each gateway to a one of the selected gateways while maintaining communications with a destination device through the wireless network; and the wireless network operative to adaptively forming backup adjacencies when at least one of the adjacencies has failed.

16. The wireless network of claim 15, further comprising at least one gateway of a first subset querying client information from at least one gateway of a second subnet when a client device roams from the first subnet to the second subnet.

17. The wireless network of claim 15, further comprising client data of a roaming client being routed between adjacent gateways.

18. A method of selecting adjacencies between gateways of different subnets of a wireless network, comprising:
creating an ordered list of all the subnets of the wireless network;
creating an ordered list of all gateways within each subnet;
selecting an originator subnet from the ordered list of subnets;
selecting a destination subnet from the ordered list of subnets;
for each gateway of the originator subnet selecting at least two gateways from the ordered list of gateways of the destination subnet;
forming adjacencies between each of the gateways of the originator subnet and the selected at least two consecutively ordered gateways of the destination subnet; comprising each gateway notifying the selected gateways of the selection, and each selected gateway responding with a confirmation of the selection; wherein gateways that have adjacencies formed between them exchange subnet properties; and wherein
a central server performs the method of selecting adjacencies between gateways.

19. The method of claim 18, further comprising:
determining how many adjacencies are to be formed between the originator subnet and the destination subnet by determining which of the originator subnet and the destination subnet has a larger number of gateways, multiplying the number of gateways of the larger subnet by a redundancy number, and dividing the result by a number of gateways within the originator subnet.

20. The method of claim 19, further comprising:
for a first ordered gateway of the originator subnet selecting a plurality of first ordered gateways of the destination subnet;
for each successive gateway of the originator subnet selecting a next of plurality of gateways of the destination subnet, until selections have been made to occupy the entire number of adjacencies to be formed between the originator subnet and the destination subnet.

21. The method of claim 20, further comprising for each of remaining subnets of the ordered list of subnets, designating each of remaining subnets the originator subnet, and repeating the selection of adjacencies with destination subnets.

22. The method of claim 18, further comprising continuously selecting originator and destination subnets until each gateway of each subnet has at least two gateways of all other subnets for formation of adjacencies.

23. The method of claim 18, wherein each gateway performs the method of selecting adjacencies between gateways, wherein each gateway creates a same ordered list of subnets, and a same list of ordered gateways for each subnet.

* * * * *